Figure 1:
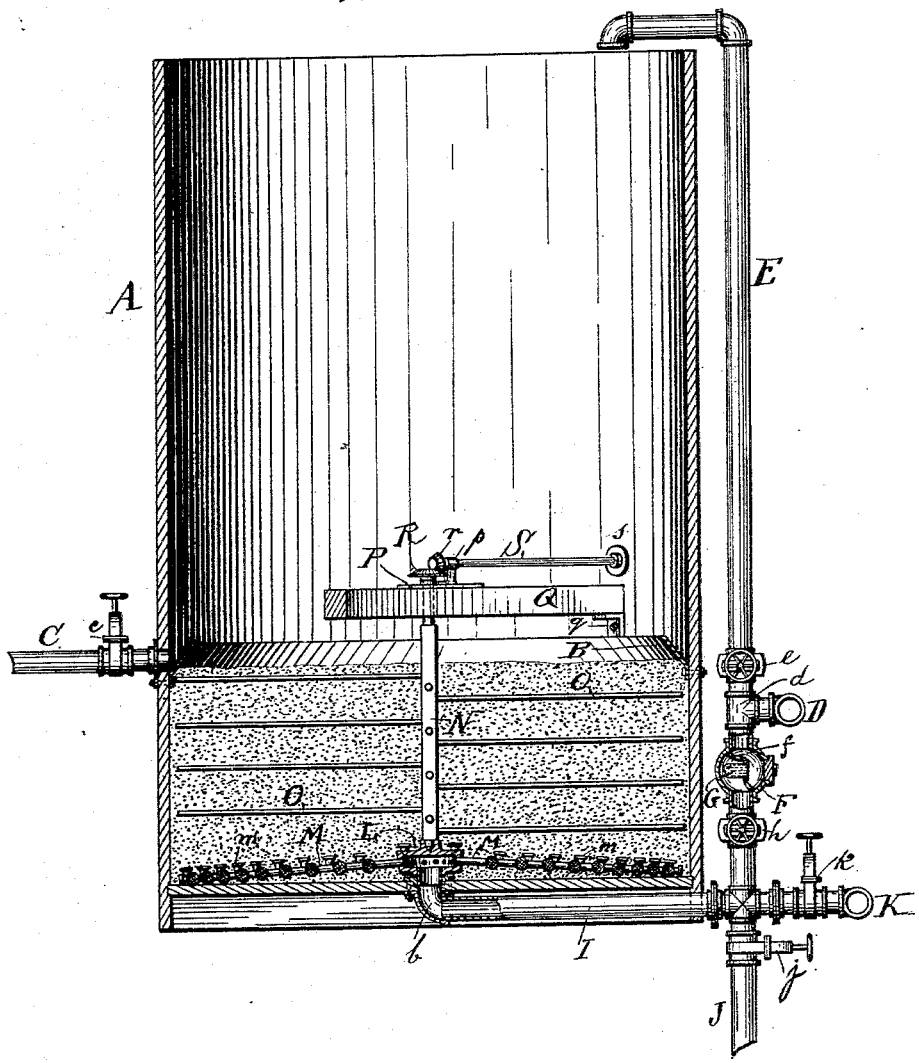

(No Model.) 2 Sheets—Sheet 1.

O. H. & W. M. JEWELL.
FILTER.

No. 425,573. Patented Apr. 15, 1890.

Witnesses
Otto Luebkert
Owen V. Stookey

Inventors:
Omar H. Jewell
William M. Jewell
By Wm. C. Lotz
their Attorney (No Model.) 2 Sheets—Sheet 2.
O. H. & W. M. JEWELL.
FILTER.
No. 425,573. Patented Apr. 15, 1890.
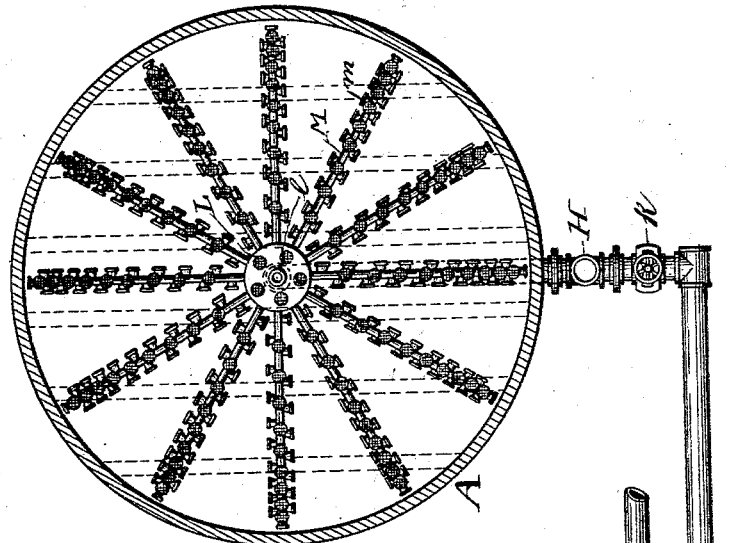
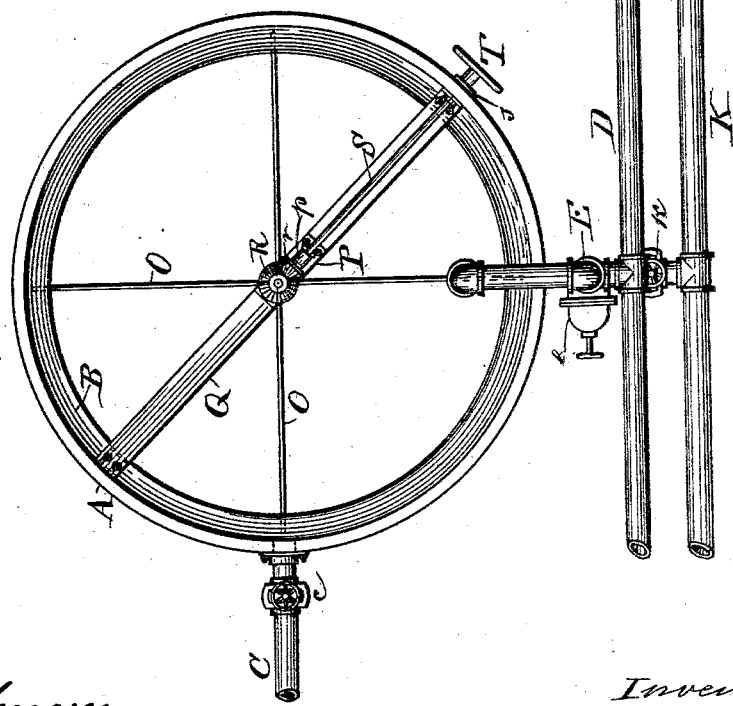
Witnesses.
Otto Luebkert
Owen V. Storkey
Inventors:
Omar H. Jewell
William M. Jewell
By Wm. H. Lotz
his attorney

UNITED STATES PATENT OFFICE.

OMAR H. JEWELL AND WILLIAM M. JEWELL, OF CHICAGO, ILLINOIS.

FILTER.

SPECIFICATION forming part of Letters Patent No. 425,573, dated April 15, 1890.

Application filed January 20, 1890. Serial No. 337,468. (No model.)

*To all whom it may concern:*

Be it known that we, OMAR H. JEWELL and WILLIAM M. JEWELL, citizens of the United States of America, residing at Chicago, in the county of Cook and State of Illinois, have invented certain new and useful Improvements in Filters, of which the following is a specification, reference being had therein to the accompanying drawings.

This our invention relates to apparatus for filtering water, and more particularly to the class of apparatus known as "gravity-filters;" and it is the object of this our invention to provide such a filter of simple construction, in which provision is made for washing and rewashing the filtering material, for agitating such filtering material during the washing operation, and for straining the water used for washing previous to entering the filter, for separating therefrom all matter liable to choke the strainer-cups in the filter; and with these objects in view our invention consists of the novel devices and combinations of devices hereinafter described and specifically claimed.

In the accompanying drawings, Figure 1 represents a vertical cross-section through the center of the filtering-tank; Fig. 2, a plan view, and Fig. 3 a sectional plan on line 3 3 in Fig. 1.

Corresponding letters of reference in the several figures of the drawings designate like parts.

A denotes the filtering-tank, preferably made cylindrical or conical and of wood or metal. At about one-third or one-quarter of its entire height is secured around the inner wall of such tank a conical ring B, preferably formed of sheet metal, and secured with its lower flange by screws to the tank to form a tight joint therewith. This ring B, thus attached, provides a circular or endless trough communicating with a pipe C, tapped through the side of the tank, which pipe C is provided with a stop-valve $c$, and is to connect with the sewer.

D is the water-supply pipe, connecting with a force or feed pump or with an elevated tank or reservoir, which pipe D may supply a series of tanks A, each through a stand-pipe E, connected with pipe D by a T-coupling $d$ and having a horizontal upper spout end extending over the tank A for discharging into the same, and this pipe E is provided with a stop-valve $e$. To the bottom of T-coupling $d$ is connected a globular casing F, between the inlet and outlet nozzles of which is a diaphragm $f$, bored to receive and removably hold a pocket or cup shaped strainer G, through which water on its downcourse must pass, and opposite to the open end of this strainer-cup G said casing is provided with an opening through which said strainer may be cleaned or removed and which is closed by a screw-plug $g$.

To the bottom opening of strainer-casing F is coupled a stop-valve $h$, connecting by a pipe $i$ with a star-coupling H, that to its bottom has coupled pipe J, provided with stop-valve $j$ and leading into the sewer. One end of star-coupling H, through an intermediate stop-valve $k$, communicates with the pure-water-conducting pipe K, and the opposite end of said star-coupling has connected the pipe I, communicating through an elbow $b$ and through a hole in the bottom of tank A with a chamber-head L, rigidly secured upon the center of the bottom of the tank and having coupled a series of radial pipes M, the exterior ends of which, extending to near the sides of the tank, are closed by screw-caps. Each such pipe M is perforated with multiple holes, into each of which is tapped a strainer-cup $m$. These pipes M are placed on an incline to rest with their exterior ends upon the bottom of tank A.

The upper face of chamber-head L has a central boss $l$, with a socket forming the step-bearing for the lower pointed end of a vertical shaft N, preferably made of a square bar of metal with a series of holes drilled through it transversely in both directions for securing therein radial arms O of round, square, or flat iron extending to within a short distance from the walls of tank A. The upper end of shaft N is turned cylindrical, and is extended through the boss of a bearing-plate P, fixed upon a bar or beam Q, secured in the tank on a diametrical position above ring B, upon angle-plates $q$. Upon the upper extremity of shaft N is rigidly mounted a bevel-wheel R, meshing with a bevel-pinion $r$, mounted upon one end of a horizontal shaft S, pivoted in bracket-bearing $p$ of plate P and projecting through a gland or stuffing box $s$, secured in the wall of tank A, having mounted upon its exteriorly-projecting end a hand-wheel T, which, with turning, will impart a rotating movement to shaft N and arms O for agitating the filtering material filled in the bottom of tank A to about the line of the bottom of conical ring B.

The operation of this filter is as follows, to wit: The valves $h$, $j$, and $c$ being closed and the valves $e$ and $k$ opened, water forced in from pipe D will flow through pipe E into the top of tank A, filling the same. This water by its gravity will trickle through the filtering material to be cleared of all impurities contained therein, which filtering process being greatly augmented by the head of water above the filtering material, the additional weight of which water will accelerate its passage through such filtering material, and the water thus purified will then escape through the strainer-cups $m$ and pipes M into head L, and thence through pipe I into pipe K, which will lead it off into a storage-tank or direct to the consumers. The advantage of the extra height of a tank for filtering by gravity only will thus be readily seen. This tank A is to be kept filled with water by regulating the feed to be about equal to the discharge by adjustment of valve $e$.

Whenever it is desirable to wash out the tank for removing the impurities collected therein I first close valve $e$ for stopping the feed, and then, after all the water contained in the tank has been filtered and discharged into pipe K, I also close valve $k$ and open valves $h$ and $c$. Now the water from pipe D will first pass through the strainer-cup G, in which it will leave behind all impurities apt to choke the filter-cups $m$, will thence pass through pipe I into chamber-head L, and from there through pipes M and strainers $m$, whence the water will rise through the filtering material and will overflow the upper edge of trough B to escape through pipe C, carrying with it all impurities collected on top and in the filtering material. During the time the current is thus reversed, the filtering material by the up current of the water will be partially suspended so as to be a semi-liquid mass which can be agitated by turning hand-wheel T for rotating or oscillating the shaft N with arms O, whereby slimy matter adhering to the particles of filtering material will be loosened and liberated to be carried off by the water. After the filtering material has thus been thoroughly washed, a rewash is required for removing impurities separated from the washout water and deposited in the lower strata of the filtering material and in the filtering-cups $m$, to be carried off by the first water filtering through the material from top downward, which first water is not fit to use, and is to be carried off into the sewer through pipe J, for which purpose we close valves $h$ and $c$ and open valves $e$ and $j$ until the water carried through pipe I proves to be perfectly clear, when valve $j$ is closed and valve $k$ is opened again.

With a trough B made to extend around the tank on all sides and being continuous, impurities will be more readily carried off from all parts of the tank than with a direct outlet, and such trough B, being placed close over the top line of the filtering material, a great deal less water will be required for a washout than with the trough or escape-pipe placed in top of the tank.

The agitating-arms being secured upon a solid shaft pivoted in the bottom of the filtering material only in a step-bearing, this will cause less friction, and will prevent filtering material from working in between moving parts that would cut and wear the metal. Besides, a solid shaft will provide a cheaper and stronger connection for the agitating-arms.

The strainer G, interposed between the supply-pipe D and pipe I, will be of great utility, having found ourselves by experience that without such the perforations in the strainer-cups $m$ would soon be filled during a wash-out with impurities introduced with the water.

What we claim is—

1. The combination, with tank A, provided with chamber-head L, branch pipes M, with strainer-cups $m$, and with pipes I, of endless trough B, and pipe C, with valve $c$, substantially as set forth.

2. The combination, with tank A, provided with chamber-head L, branch pipes M, having strainer-cups $m$, with pipe I, commuicating through stop-valves with pipes D, K, and J, and with pipe E, communicating through a stop-valve with pipe D, of endless trough B, communicating with discharge-pipe C through a stop-valve $c$, all substantially as set forth, for the purpose specified.

In testimony whereof we affix our signatures in presence of two witnesses.

OMAR H. JEWELL.
WILLIAM M. JEWELL.

Witnesses:
WILLIAM H. LOTZ,
OTTO LUEBKERT.